United States Patent [19]

Dechaux

[11] 4,404,794
[45] Sep. 20, 1983

[54] TURBO-GENERATOR FOR A ROTARY WING HELICOPTER

[76] Inventor: Charles Dechaux, 4 Ave. de la Porte de Sevres, 75015 Paris, France

[21] Appl. No.: 230,945

[22] PCT Filed: May 21, 1980

[86] PCT No.: PCT/FR80/00083
§ 371 Date: Jan. 16, 1981
§ 102(e) Date: Jan. 16, 1981

[87] PCT Pub. No.: WO80/02542
PCT Pub. Date: Nov. 27, 1980

[30] Foreign Application Priority Data

May 21, 1979 [FR] France .............................. 79 12879

[51] Int. Cl.³ .............................................. F02C 3/10
[52] U.S. Cl. ................................................. 60/39.161
[58] Field of Search ................... 60/39.16 R, 39.16 S, 60/39.16 C; 415/180

[56] References Cited

U.S. PATENT DOCUMENTS 2,150,670 3/1939 Bentley .
2,333,053 10/1943 Stroehlen ........................... 415/180
2,744,722 5/1956 Orr ..................................... 415/180
4,193,262 3/1980 Snell ..................................... 60/261

FOREIGN PATENT DOCUMENTS 1426352 12/1968 Fed. Rep. of Germany .
1373972 8/1964 France .
2373444 7/1978 France .
647580 10/1962 Italy .............................. 60/39.16 R Primary Examiner—Louis J. Casaregola
Attorney, Agent, or Firm—Spencer, Kaye & Frank

[57] ABSTRACT

A compressed air turbo-generator comprising a turbo-compressor rotatingly driven by the exhaust gas of a turbo-reactor wherein the longitudinal axes of the turbo-reactor and of the turbo-compressor converge at a gas ejection angled manifold extending from the housing of fixed and rotary crowns of the compressor. The compressor is mounted under the turbo-reactor. The turbo-generator is particularly appropriate for use in providing a compressed air supply for the reaction blades of a rotary wing helicopter.

5 Claims, 1 Drawing Figure

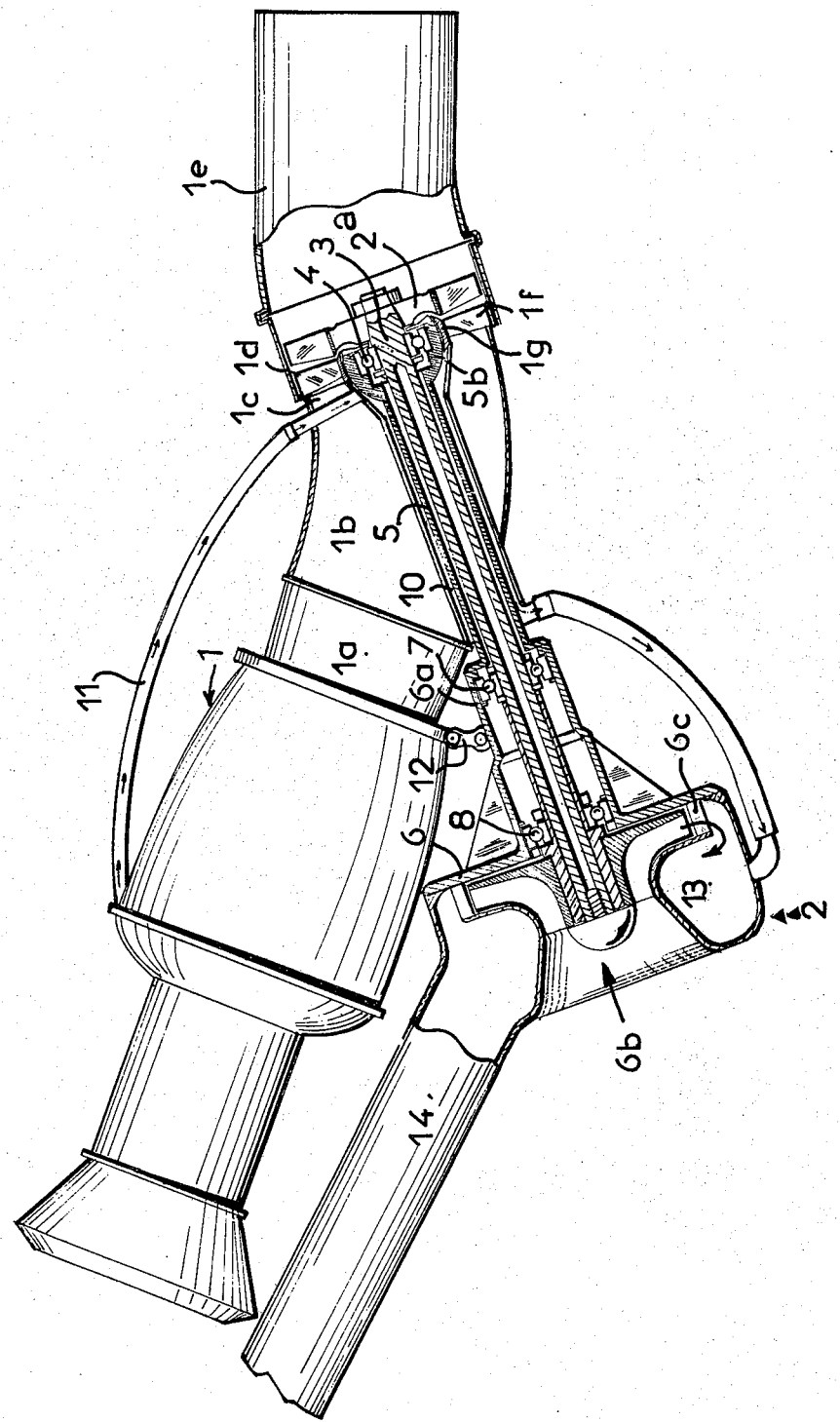

TURBO-GENERATOR FOR A ROTARY WING HELICOPTER

BACKGROUND OF THE INVENTION

This invention relates to a compressed air turbogenerator adapted to supply for example the reaction blades of the rotary wing of a helicopter.

Nowadays, turbo-generators performing such a function have their compressors alined with and following the turbo-reactors by which they are driven.

SUMMARY OF THE INVENTION

The object of the invention is to substantially reduce the length of the turbo-reactor/turbo-compressor assembly in order to enhance the efficiency, to avoid vibrations and to facilitate the cooling of the bearings.

Consequently, according to the invention, the longitudinal axes of the turbo-reactor and of the turbo-compressor respectively are converging. Such an arrangement allows the turbo-compressor to be located under the turbo-reactor.

BRIEF DESCRIPTION OF THE DRAWINGS

Other features and advantages will result from the following description and claims.

The single FIGURE of the drawing shows in section a turbo-reactor/turbo-compressor assembly according to the invention.

DESCRIPTION OF THE PREFERRED EMBODIMENT

As shown in the FIGURE, the turbo-generator includes a turbo-reactor 1 and a turbo-compressor 2 located one above another, but with their longitudinal axes in a converging relationship.

The gas exhaust manifold 1a is provided with a rearwards extending therefrom curved manifold 1b, the rear transverse plane 1c of said curved manifold being perpendicular to the longitudinal axis of the turbo-compressor.

A cylindric sleeve 1d followed by another curved manifold 1e extends from the manifold 1a beyond said plane.

However, the curvature of said other curved manifold 1e is opposite to that of the curved manifold 1b.

A driving turbine including a crown of fixed blades 1f and a rotary wheel with driving blades 2a mounted on the shaft 3 of the compressor are located within said cylindric sleeve 1d.

The shaft 3 is rotatingly mounted through an oscillating ball bearing 4, within a tubular part as member 5 which extends from the casing 6a of the body 6 of the compressor 2.

Ball bearings 7 and 8 are inserted between said shaft and the fixed parts of the compressor.

The tubular part 5 is provided at its rear end with a spherical head 5b accomodating the ball bearing 4 and forming a ball joint with the spherical portion of the crown 1g which supports the fixed blades 1f.

In its rear part located within the curved manifold 1b, the tubular part 5 is surrounded by a coaxial sheath which delimits therewith an annular space 10.

In front of the head 5b, and accordingly close to the ball bearing 4, said space 10 is connected to a pipe 11 which supplies thereto high pressure air from the compressor of the turbo-reactor, said air thus providing for the cooling of said rear ball bearing.

In order to compensate for the effects of the expansion, the body 6 is supported by the turbo-reactor through a hinged rod or member 12.

The blade wheel is keyed at the end of the shaft 3 and rotates in the compression chamber and provides for suction of air through the central aperture 6b.

The air is further discharged by the blade wheel through the lateral apertures 6c connected to the distribution chamber 13 which is directly connected to the rotor of the rotary wing through the supply duct 14.

In contrast with the conventional helical chambers, the distribution chamber of the arrangement according to the invention has a constant radial cross section so as to avoid the turbulences of the air which is discharged therefrom at a pressure of about 3 bars.

The invention is applicable more particularly for supplying the reaction blades of the rotary wing of a helicopter and in any case where a high pressure flow is desired.

In fact, one can observe that owing to the derivation of high pressure air (for example at 5 kg/cm2) from the compressor of the turbo-reactor 1 and to the supplying thereof into the annular space 10 through the pipe 11, the pressure of said air when it reaches the chamber 13, is added to the pressure of the turbo-compressor (for example 3 kg/cm2).

I claim:

1. A compressed air turbo-generator for supplying the reaction blades of the rotating wing of a helicopter, comprising
   a turbo-reactor including a gas exhaust manifold, said turbo-reactor having a longitudinal axis;
   a turbo-compressor having a longitudinal axis intersecting the longitudinal axis of said turbo-reactor at an actue angle, said turbo-compressor being located adjacent said turbo-reactor;
   a driving turbine located within the gas exhaust manifold of said turbo-reactor, said turbine including a rotary wheel rotatable about the longitudinal axis of said turbo-compressor;
   a shaft having one end secured to the rotary wheel of said driving turbine and the other end to said turbo-compressor for the rotation thereof;
   a tubular member forming part of said turbo-compressor surrounding said shaft;
   bearing means interposed between said tubular member and said shaft for rotation of said shaft within said tubular member, said bearing means including a rear ball bearing at the rotary wheel of said turbine; and
   a hinged member pivotably coupled at one end to said turbo-reactor and the other end to said turbo-compressor, said hinged member permitting said turbo-compressor to be pivoted in a plane defined by said longitudinal axis about a point located in the region of the rotary wheel of said driving turbine.

2. A compressed air turbo-generator as defined by claim 1 wherein said driving turbine further comprises a plurality of fixed blades and a crown having a spherical portion supporting said fixed blades, and wherein said tubular member includes a spherical head pivotable within the spherical portion of said crown.

3. A compressed air turbo-generator as defined by claim 1 or 2 which further comprises a fixed coaxial sheath surrounding said tubular member, said sheath and tubular member defining an annular space therebetween; and a supply pipe coupling said turbo-reactor to said annular space, said supply pipe conducting high pressure air from said turbo-reaction to said annular space for cooling said rear ball bearing.

4. A compressed air turbo-generator as defined by claim 1 wherein said turbo-compressor includes a distribution chamber coupled to said annular space, said turbo-generator further including a supply duct coupled to said distribution chamber for supplying low pressure air from said turbo-reactor to the reaction blades of the rotating wing of said helicopter.

5. A compressed air turbo-generator as defined by claim 2 wherein said turbo-compressor includes a rotor, and wherein said distribution chamber is coaxial therewith, said distribution chamber having a constant radial cross-section.

* * * * *